M. A. Keller,
Universal Joint.
No. 105,696.        Patented July 26, 1870.

UNITED STATES PATENT OFFICE.

MOSES A. KELLER, OF LITTLESTOWN. PENNSYLVANIA.

IMPROVEMENT IN UNIVERSAL SHAFT-COUPLINGS.

Specification forming part of Letters Patent No. 105,696, dated July 26, 1870.

*To all whom it may concern:*

Be it known that I, MOSES A. KELLER, of Littlestown, in the county of Adams and State of Pennsylvania, have invented a new and Improved Universal Coupling-Joint; and I do here declare that the following is a full, clear, and exact description thereof, which will enable others skilled in the art to make and use the same, reference being had to the accompanying drawing forming part of this specification.

This invention relates to improvements in universal coupling-joints for shafts, and consists in a concave socket in the end of one section, with a short cylindrical extension, and a ball on the other fitting the socket, and secured to the socketed section by a pin or bolt fixed in the shell of the socketed section, and passing transversely through a bolt in the ball, and traversing its axis perpendicular to a slot formed in the ball for the pin of the socketed section, all as hereinafter more fully specified.

Figure 1:
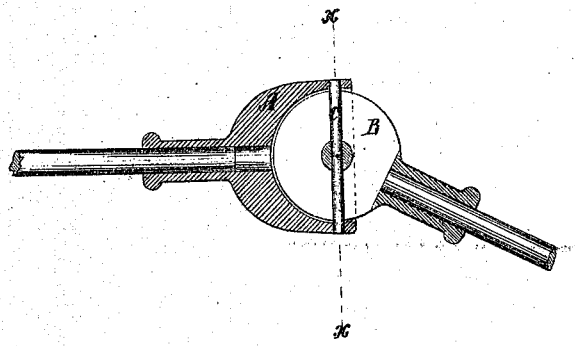
Figure 2:
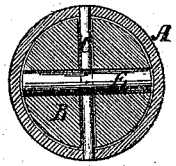

Figure 1 is a longitudinal section of my improved coupling-joint, and Fig. 2 is a transverse section taken on the line $x$ $x$ of Fig. 1.

Similar letters of reference indicate corresponding parts.

A is the socketed section, which has a socket which is a true hollow hemisphere and a cylindrical extension beyond the line $x$. B is the spherical section which fits the socket, and has a deep slot, into which a pin or bolt, C, fixed in the shell A on the line $x$ $x$, works. E is a larger bolt passing through the axis of the ball perpendicular to the slot, and through which the bolt C passes. This bolt is kept in position by the walls of the shell A, and the ball oscillates on it. The said ball also oscillates on the axis of the pin C, and thus has the necessary universal motion. The two bolts hold the sections in connection.

I do not claim a new universal shaft-coupling, since I am aware that such a claim would necessitate the production of a coupling operating upon a new principle, or exhibiting a new mode of operation, but my invention is simply an improvement upon an old manufacture.

The object which I have in view is to introduce to the public a closed joint, so constructed that it will not lack any of the required flexibility. A law prevails in many of the States which compels manufacturers to box their shaft-joints, to avoid danger. I propose to remedy this difficulty and do away entirely with the necessity for boxing by closing the joint.

What, therefore, I esteem as my invention, and desire to protect by Letters Patent, is—

The hemispherically-socketed shaft-piece A, having extension-lips over its diametrical plane, and the slotted spherical shaft-section B, combined with diametrical bolts C E, placed at right angles to each other, the former fast to the socket A and passing through the latter, all as and for the purpose described.

The above specification of my invention signed by me this 29th day of March, 1870.

MOSES A. KELLER.

Witnesses:
GEO. W. MABEE,
ALEX. F. ROBERTS.